3,557,284
POULTRY FEEDS AND POULTRY FEED ADDITIVES CONTAINING 5-NITROFURFURYLIDENEMETHYL COMPOUNDS

Max Wilhelm, Allschwil, and Kurt Eichenberger, Therwil, Switzerland, assignors to Ciba Corporation, New York, N.Y., a corporation of Delaware
No Drawing. Continuation-in-part of application Ser. No. 494,238, Oct. 8, 1965, now Patent No. 3,488,728. This application Oct. 9, 1967, Ser. No. 673,988
Claims priority, application Switzerland, Oct. 26, 1966, 15,539/66; Sept. 15, 1967, 12,916/67
Int. Cl. A61k 27/00
U.S. Cl. 424—250    17 Claims

ABSTRACT OF THE DISCLOSURE

Poultry feeds and poultry feed additives containing a compound of the formula

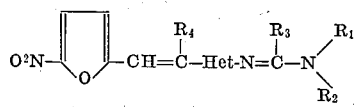

Het=bivalent heterocyclic radical of aromatic character containing at least one ring nitrogen atom;
$R_4$=hydrogen or alkyl;
$R_3$=hydrogen or optionally substituted hydrocarbon radical;
$R_1$, $R_2$ each
  =hydrogen or optionally substituted monovalent hydrocarbon radical or together,
  =optionally substituted bivalent hydrocarbon radical which may be interrupted by hetero atoms;

e.g. poultry feeds or poultry feed additives containing N - [3 - (5 - nitrofurfurylidenemethyl)-6-pyridazinyl]-N', N'-dimethylformamidine or a salt thereof. Use: for ensuring better feed utilisation and increase in weight.

CROSS-REFERENCES TO RELATED APPLICATION

This application is a continuation-in-part of application Ser. No. 494,238, filed Oct. 8, 1965, and now U.S. Pat. No. 3,488,728.

SUMMARY OF THE INVENTION

The present invention relates to poultry feeds and additives to poultry feeds containing an amidine in which a nitrogen atom is joined to a ring carbon atom or a heterocyclic radical aromatic in character which may be substituted and which contains at least one ring nitrogen atom, which radical is substituted by a 5-nitrofurfurylidene methyl radical in a position that activates a methyl radical, or a salt thereof and a process for rearing poltry consisting in administering such feeds to poultry. The said feeds ensure a better feed utilization and an increase in weight.

The heterocyclic radical of aromatic character in the above-mentioned amidines is a mononuclear or polynuclear radical aromatic in character that contains at least one heterocyclic ring aromatic in character containing at least one ring nitrogen atom. Radicals of the kind defined are, for example, radicals that comprise six-membered rings containing a nitrogen atom, for example, pyridine or quinoline radicals, radicals that comprise six-membered and/or five-membered rings containing two nitrogen atoms, for example, diazine radicals such as pyridazine, pyrimidine or pyrazine radicals, and also diazole radicals such as pyrazole, imidazole or benzimidazole radicals, radicals that comprise five-membered and, if desired, six- membered rings containing a nitrogen atom and an oxygen or a sulfur atom, for example, oxazole, thiazole, benzoxazole or benzthiazole radicals, radicals that comprise five-membered rings containing two nitrogen atoms and an oxygen or a sulfur atom, for example, thiadiazole or oxadiazole radicals, or radicals that comprise five-membered or six-membered rings containing three nitrogen atoms, for example, triazine or triazole radicals.

As substituents attached to carbon atoms of the above-mentioned heterocyclic radicals there may be mentioned, in particular, lower alkyl radicals, for example, methyl, ethyl, propyl or isopropyl radicals, straight- chain or branched butyl, pentyl or hexyl radicals bound in any desired position, lower alkoxy groups, for example, methoxy, ethoxy, propoxy or butoxy groups, halogen atoms, for example, chlorine, bromine or iodine atoms, trifluoromethyl groups or nitro groups.

In heterocyclic radicals containing a hydrogen atom bonded to a ring nitrogen atom, the said hydrogen atom may also be replaced by lower alkyl radicals or acyl radicals, especially benzoyl radicals or above all by lower alkanoyl radicals, for example, acetyl radicals. The 5-nitrofurfurylidene methyl radical is, in particular, in α-position to a ring nitrogen atom or, if necessary, in γ-position to a ring nitrogen atom.

The new compounds may contain further substituents, for example, lower alkyl radicals bound to the methyl radical of the 5-nitrofurfurylidene methyl radical, for example, the lower alkyl radicals indicated above.

The amidine nitrogen atoms may be unsubstituted or substituted. In particular, the N'-nitrogen atom may be monosubstituted or disubstituted, for example, by substituted or unsubstituted aliphatic, cycloaliphatic, cycloaliphatic-aliphatic, araliphatic or aromatic hydrocarbon radicals, for example, by alkyl radicals, for example, those indicated above, alkenyl radicals, for example, lower alkenyl radicals, for example, allyl or methallyl radicals, alkylene radicals, which may also be interrupted by hetero atoms, for example, oxygen, sulfur or nitrogen atoms, for example, lower alkylene radicals interrupted by hetero atoms, for example, butylene-(1:4), butylene-(1:5), hexylene-(1:5), hexylene-(1:6), hexylene-(2:5), heptylene-(1:7), heptylene-(2:7), heptylene-(2:6), 3-oxy- or azapentylene-(1:5), 3-oxa- or aza-hexylene-(1:6) radicals, cycloalkyl, cycloalkenyl, cycloalkyl-alkyl or cycloalkenyl-alkyl radicas, for exampe, cycopentyl, cyclohexylor cycloalkenyl-alkyl radicals, for example, cyclopentyl, cyclohexyl, cyclopentenyl or cyclohexenyl radicals, cyclopentyl-, cyclohexyl-, cyclopentenyl-, cyclohexenyl-methyl or -ethyl radicals, aralkyl or aryl radicals, for example, phenyl lower alkyl radicals, for example, benzyl or 1- or 2-phenylethyl radicals, or phenyl radicals that may be unsubstituted in the aryl radical or substituted by lower alkyl radicals, lower alkoxy groups, halogen atoms and/or trifluoromethyl groups.

The N' nitrogen atom together with its substituents forms, in particular, a mono- or di-lower alkylamino group, for example, a methylamino, dimethylamino, ethylamino or diethylamino group, a phenyl-lower-alkylamino, (phenyl - lower-alkyl)-amino, phenyl-lower-alkyl-loweralkylamino or di(phenyl-lower-alkyl)-amino group, for example, a benzylamino, phenylethylamino, benzyl-loweralkylamino, dibenzylamino or diphenylethylamino group, or a pyrrolidino, piperidino, morpholino, thiamorpholino or piperazino group, for example, the N-methylpiperazino group.

The amidines are advantageously derived from aliphatic, araliphatic or aromatic carboxylic acids, especially from fatty acids, for example, alkane carboxylic acids, for example, formic acid, acetic acid, propionic acid, butyric acid, valeric acid, aryl or arylalkane carboxylic acids, for example, benzoic acids, or phenyl-lower alkane carboxylic acids, for example, phenyl acetic or phenylpropionic acids, which may also be substituted as indicated above for the aryl radicals.

As salts of the above amidines there may be mentioned, for example, neutral, acid or mixed non-toxic acid addition salts which may also be present as hemi-, mono-, sesqui- or polyhydrates. Acids suitable for forming salts are, for example, mineral acids such as hydrochloric or hydrobromic acid, sulphuric or phosphoric acids, nitric or perchloric acid; or aliphatic, alicyclic, aromatic or heterocyclic carboxylic or sulphonic acids such as formic, acetic propionic, oxalic, succinic, glycollic, lactic, malic, tartaric, citric, ascerbic, maleic, hydroxymaleic, dihydroxymalei or pyruvic acid; phenylacetic, benzoic, para-aminobenzoic, anthranilic, para-hydroxybenzoic, salicylic or para-aminosalicylic acid; methanesulfonis, ethanesulphonic, hydroxyethanesulphonic or ethylenesulphonic acid; toluenesulphonic, naphthalenesulphonic acids or sulphanilic acid; methionine, tryptophan, lysine or arginine.

Poultry feeds and poultry feed additives thereto, containing the compounds mentioned above, possess valuable properties. Above all they ensure better feed utilization and increase in weight of the fowls. They are especially suitable for use as chicken feeds, especially turkey feeds and additives thereto. Special mention deserve those poultry feeds and poultry feed additives which contain the compounds indicated herein or their salts. The symbol Nfm in all cases represents a radical of the formula

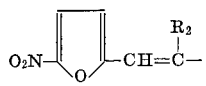

in which $R_1$ and $R_2$ represents hydrogen, phenyl radicals a hydrogen atom, and A represents a radical of the formula

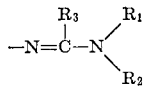

in which $R_1$ and $R_2$ represents hydrogen, phenyl radicals or especially lower alkyl radicals, or $R_1$ and $R_2$ together with the nitrogen atom form a pyrrolidino, piperidino, piperazino, morpholino or thiomorpholino radical, and $R_3$ represents a lower alkyl radical, a phenyl radical or especially a hydrogen atom:

(a) A-4-Nfm-quinolines that may be substituted at ring carbon atoms by lower alkyl radicals, lower alkoxy groups, halogen atoms and/or trifluoromethyl groups, but that are preferably unsubstituted, especially corresponding 2-A-4-Nfm-quinolines;

(b) A-2-Nfm-quinolines that may be substituted at ring carbon atoms by lower alkyl radicals, lower alkoxy groups, halogen atoms and/or trifluormethyl groups, but that are preferably unsubstituted, especially corresponding 4-A-2-Nfm-quinolines or corresponding 8-A-2-Nfm-quinolines or more especially corresponding 5-A-2-Nfm-quinolines and corresponding 6-A-2-Nfm-quinolines;

(c) A-4-Nfm-pyridines that may be substituted at ring carbon atoms by lower alkyl radicals, lower alkoxy groups, halogen atoms and/or trifluoromethyl groups, but that are preferably unsubstituted, especially corresponding 2-A-4-Nfm-pyridines;

(d) A-2-Nfm-pyridines that may be substituted at ring carbon atoms by lower alkyl radicals, lower alkoxy groups, halogen atoms and/or trifluoromethyl groups, but that are preferably unsubstituted, especially 5-A-2-Nfm-pyridines or corresponding 6-A-2-Nfm-pyridines;

(e) A-3-Nfm-pyridazines that may be substituted at ring carbon atoms by lower alkyl radicals or preferably by lower alkoxy groups or especially by halogen atoms and/or trifluoromethyl groups, but that are preferably unsubstituted, especially 6-A-3-Nfm-pyridazines;

(f) A-4-Nfm-pyridazines that may be substituted at ring carbon atoms by lower alkyl radicals or preferably by lower alkoxy groups or especially by halogen atoms and/or trifluoromethyl groups, but that are preferably unsubstituted, especially corresponding 3-A-4-Nfm-pyridazines or corresponding 6-A-4-Nfm-pyridazines;

(g) A-2-Nfm-pyrimidines that may be substituted at ring carbon atoms by lower alkyl radicals, lower alkoxy groups, halogen atoms and/or trifluoromethyl groups, but that are preferably unsubstituted, especially corresponding 4-A-2-Nfm-pyrimidines;

(h) A-4-Nfm-pyrimidines that may be substituted at ring carbon atoms by lower alkyl radicals, lower alkoxy groups, halogen atoms and/or trifluoromethyl groups, but that are preferably unsubstituted, especially corresponding 2-A-4-Nfm-pyrimidines;

(i) A-2-Nfm-pyrazines that may be substituted at ring carbon atoms by lower alkyl radicals, lower alkoxy groups, halogen atoms and/or trifluoromethyl groups, but that are preferably unsubstituted, especially corresponding 5-A-2-Nfm-pyrazines or corresponding 6-A-2-Nfm-pyrazines;

(k) A-2-Nfm-imidazoles that may be substituted at ring carbon atoms by lower alkyl radicals, lower alkoxy groups, halogen atoms or trifluoromethyl groups, but that are preferably unsubstituted, and that are unsubstituted at ring nitrogen atoms, but that may be substituted at a ring nitrogen atom by lower alkyl radical, especially corresponding 4-A-2-Nfm-imidazoles;

(l) A-3-Nfm-pyrazoles that may be substituted at ring carbon atoms by lower alkyl radicals, lower alkoxy groups, halogen atoms or trifluoromethyl groups, but that are preferably unsubstituted, and that are unsubstituted at ring nitrogen atoms, but that may be substituted at a ring nirogen atom by a lower alkyl radical, especially corresponding 5-A-3-Nfm-pyrazoles;

(m) A-2-Nfm-benzimidazoles that may be substituted at ring carbon atoms by lower alkyl radicals, lower alkoxy groups, halogen atoms and/or trifluoromethyl groups, but that are preferably unsubstituted, and that are unsubstituted at ring nitrogen atoms, but that may be substituted at a ring nitrogen atom by a lower alkyl radical or a lower alkanoyl or benzoyl radical, especially corresponding 5-A-2-Nfm-benzimidazoles;

(n) A-2-Nfm-oxazoles that may be substituted at ring carbon atoms by lower alkyl radical, lower alkoxy groups, halogen atoms or trifluoromethyl groups, but that are preferably unsubstituted, especially corresponding 4-A-2-Nfm-oxazoles;

(o) A-2-Nfm-thiazoles that may be substituted at ring carbon atoms by lower alkyl radicals, lower alkoxy groups, halogen atoms or trifluoromethyl groups, but that are preferably unsubstituted, especially 4-A-2-Nfm-thiazoles;

(p) A-2-Nfm-benzoxazoles that may be substituted at ring carbon atoms by lower alkyl radicals, lower alkoxy groups, halogen atoms and/or trifluoromethyl groups, but that are preferably unsubstituted, especially corresponding 5-A-2-Nfm-benzoxazoles;

(q) A-2-Nfm-benzthiazoles that may be substituted at ring carbon atoms by lower alkyl radicals, lower alkoxy groups, halogen atoms and/or trifluoromethyl groups, but that are preferably unsubstituted, especially corresponding 5-A-2-Nfm-benzthiazoles;

(r) 5-A-2-Nfm-1:3:4-oxdiazoles;

(s) 5-A-2-Nfm-1:3:4-thiadiazoles;

(t) A-6-Nfm-1:2:4-triazines that may be substituted at ring carbon atoms by lower alkyl radicals, lower alkoxy groups, halogen atoms or trifluoromethyl groups, but that are preferably unsubstituted, especially corresponding 3-A-6-Nfm-1:2:4-triazines;

(u) A-3-Nfm-1:2:4-triazines that may be substituted at ring carbon atoms by lower alkyl radicals, lower alkoxy groups, halogen atoms or trifluoromethyl groups, but that are preferably unsubstituted, especially corresponding 6-A-3-Nfm-1:2:4-triazines;

(v) 4-A-2-Nfm-1:3:5-triazines that may be substituted at ring carbon atoms by lower alkyl radicals, lower alkoxy groups, halogen atoms or trifluoromethyl groups, but that are preferably unsubstituted;

(w) 5-A-3-Nfm-1:2:4-triazoles.

Particularly valuable are poultry feeds and poultry feed additives containing 6-A-2-Nfm-quinolines or salts thereof, e.g. N-[2-(5-nitrofurfurylidenemethyl) - 6 - quinolyl]-N',N'-dimethylformamidine or N - [2-(5 - nitrofurfurylidenemethyl)-6-quinolyl]-N'butyl-acetamide or their salts and especially those containing 6-A-3-Nfm-pyridazines or their salts and, in particular, N-[3-(5-nitrofurfurylidenemethyl)-6-pyridazinyl]-N':N-dimethylformamidine or its salts.

The poultry feeds of this invention contain about 2 to 200 grams, especially 5 to 100 grams, of active substance per metric ton. The content of active substances in the additives to poultry feeds may be varied within wide limits so that there is no need to give relevant details. Apart from the aforementioned active substances the poultry feeds contain the usual ingredients such as grains, protein additives, mineral salts, herbage, vitamin additives, antimicrobial agents, especially antibiotics and other substances in the amounts known to be an optimum for the individual feed.

Examples of suitable ingredients of feeds are: Barley, barley flour, buckwheat, maize, cornmeal, sorghum, oats, porridge, oatmeal, oat flakes, rye, wheat, wheat shorts, wheat scrap, milk, bone meal, meat meal, meat scraps, maize gluten meal, oil cake meal, soybean flour, dairy residues, fish meal, corn distillers' solubles, lucernes, dried lucerne flour, clover, grass, cabbage, savoy cabbage, cod-liver oil and similar nutrients; also mineral additives such as dicalcium phosphate, calcium carbonate, iodized salt, manganese suphate, zinc salts, cobalt salts, iron salts or copper salts, vitamins e.g. vitamin A, niacin, calcium pantothenate, thiamin, riboflavin, vitamin $B_{12}$, ascorbic acid, vitamin D or vitamin E; other essential additives for example butyloxytoluene or methionine, antimicrobial agents, especially antibiotics, for example bacitracin, penicillin, tetracyclin, chlorotetracyclin, oxytetracyclin or erythromycin.

It is advantageous to prepare a pre-mixture containing the active substance in conjunction or admixture with a suitable carrier. Such carriers are, for example, wheat scraps, starches, cane sugar, lactose, mannitol, sodium gluconate, soybean feeds extracted with solvents or other suitable admixtures; other additives, such as buffers or buffer systems, for example citric acid+sodium citrate, sodium acetate, dipotassium phthalate+phthalic acid, sodium benzoate+benzoic acid, sodium lactate+lactic acid or sodium fumarate+fumaric acid; wetting agents such as salts of ethylenediamine-tetraacetic acid, for example the tetrasodium salt of ethylenediamine-tetraacetic acid (which may also contain monosodium salts of N,N-bis-(2-hydroxyethyl)-glycine) or other suitable substances, such as antioxidants or stabilizers. A pre-mixture contains about 0.1 to about 20%, especially 0.5 to about 10%, of the active substance in conjunction with a suitable mixture of carriers and assistants.

These feeds are prepared by known methods by adding the pre-mixture to feeds in an amount such that the final product has the desired concentration of active ingredient. Alternatively, the active substances may be administered in solution or dispersion, for example in drinking water or in any other desired form.

The active compounds can be obtained, for example, by the process described in Indian patent application No. 96,505, for example by reacting a heterocyclic compound of aromatic character which may be substituted and contains at least one ring nitrogen atom, and which contains a 5-nitrofurfurylidene-methyl radical in a position capable of activating a methyl radical, and an amino group on a different ring carbon atom, with a thioamide, a thioimino ether or with an enol ether (imino ether), enol ester (imino ester) or an acetal of a carboxylic acid amide, or a salt thereof, or by reacting a heterocyclic compound of aromatic character which may be substituted and contains at least one ring nitrogen atom, and which contains a 5-nitrofurfurylidene methyl radical in a position capable of activating a methyl radical, and an acylamino radical on a different ring carbon atom, with triethyloxonium fluoborate, and then with an amine containing at least one hydrogen atom.

The following examples illustrate the invention.

EXAMPLE 1

Manufacture of poultry feed from the following ingredients:

Main ingredients (pre-mixture)—
N-[3-(5'-nitrofurfurylidenemethyl)-6-pyridazinyl]-N',N'-dimethylformamidine, g.__ 44.0
Wheat, medium standard (30–80 mesh),
g. ---------------------------------- 10,956.0

Total weight, kg. ------------------- 11

Additives— Grams
Cornmeal -------------------------- 1,062.875
Fat ------------------------------- 80.000
Fish meal, 60% protein ------------- 100.000
Soybean flour, 50% protein --------- 500.000
Gluten flour ----------------------- 100.000
Alfalfa flour, dried --------------- 50.000
Corn distillers' solubles ---------- 40.000
Dicalcium phosphate ---------------- 28.000
Calcium carbonate ------------------ 20.000
Iodized salt ----------------------- 10.000
Vitamins A and D ($10^6$ A units and $25.10^4$
D units per pound) --------------- 4.000
Calcium pantothenate --------------- 0.250
Butyl-oxytoluene ------------------- 0.250
Choline chloride of 25% strength --- 2.500
Riboflavin (24 g./pound) ----------- 0.125
Vitamin $B_{12}$ (0.02 g./pound) ---------- 1.000
Methionine ------------------------- 0.500
Manganese sulphate ----------------- 0.500

Total weight ----------------------- 2000.000

The additives are admixed in the following manner:

Approximately half the cornmeal is poured into the mixer, and the remainder is mixed with the heated, liquefied fat and added, and the whole is mixed until the fat has been evenly dispersed. Then maganese sulphate, dicalcium phosphate, calcium carbonate and iodized salt are added, and then during the mixing the fish meal, soybean flour, gluten and alfalfa flour and the corn distillers' solubles. The whole is thoroughly mixed and then the vitamins A and D, calcium pantothenate, choline chloride, riboflavin, vitamin $B_{12}$, mothionine and butyl-oxytoluene are added in this order, and the whole is mixed until all ingredients have been evenly dispersed. When this point is reached, the thoroughly mixed main ingredients are added in an amount such that 50 g. of active substance are evenly distributed in each metric ton of the feed composition.

EXAMPLE 2

Feed additive

Ingredients—
N-[3-(5'-nitrofurfurylidenemethyl)-6 pyridazinyl]-N',N'-dimethylformamidine, g. __ 23.00
Cane sugar, g. --------------------- 100.00
Soybean residues (after extraction), g. ____ 877.00

Total weight, kg. ------------------ 1

The ingredients are intimately mixed and the resulting mixture may be added in the desired amount to any desired feed. For example such a mixed feed may consist of:

| Ingredients— | Grams |
|---|---|
| Alfalfa flour | 50.00 |
| Yellow maize | 1215.00 |
| Gluten flour | 50.00 |
| Animal fat | 40.00 |
| Dried malt brewers' grains | 25.00 |
| Fish meal | 100.00 |
| Oyster shells | 15.00 |
| Poultry feed additive | 100.00 |
| Soybean flour | 380.00 |
| Salt | 5.00 |
| Mixture of trace elements | 0.50 |
| Dicalcium phosphate | 15.00 |
| Vitamin mixture | 5.00 |
| | 2000.50 |

The above feed additive is added to the well mixed ingredients of the feed.

EXAMPLE 3

A chickenfeed was prepared from the following ingredients:

| | Grams |
|---|---|
| 2-(5'-nitrofurfurylidenemethyl)-6-pyridazinyl]-N',N'-dimethylformamidine | 50 |

| | Kilograms |
|---|---|
| Cornmeal | 550.00 |
| Soybean flour, 44% protein | 306.00 |
| Lucerne flour | 20.00 |
| Dicalcium phosphate | 20.00 |
| Powdered lime | 6.00 |
| Salt | 2.00 |
| Fish meal, 60% protein | 25.00 |
| Stabilized fat | 40.00 |
| Dried whey | 25.00 |
| Manganese sulphate | 0.20 |
| Zinc oxide | 0.10 |
| d,l-Methione | 0.70 |
| Vitamin mixture | 5.00 |
| | 1000.00 |

5.00 kilograms of the vitamin mixture contain 16,000,000 international units of vitamin A, 1,000,000 of vitamin $D_3$, 5000 of vitamin E-acetate, 6 g. of vitamin $K_3$, 6 mg. of vitamin $B_{12}$, 3 g. of riboflavin, 30 g. of niacin, 5 g. of calcium pantothenate, 100 g. of 1,2-dihydro-6-ethoxy-2,2,4-trimethylquinolino and cornmeal to make a total weight of 5.00 kg.

The active substance is premixed with about 1 kg. of the mixed feed which is sold ready for use. The pre-mixture is stirred with a further quantity of the mixed feed so that about 25 kg. of mixture are obtained. This mixture is stirred with a further quantity of the mixed feed horizontal mixer.

As active ingredients there may be used instead of those mentioned in Examples 1 to 3 either of the following compounds:

N-[2-(5-nitrofurfurylidenemethyl)-6-quinolyl]-N',N'-dimethyl-formamidine, M.P. 190° C.,
N-[2-(5-nitrofurfurylidenemethyl)-6-quinolyl]-N'-butylacetamidine, M.P. 215–220° C.,
N-[5-(5-nitrofurfurylidenemethyl)-1,3,4-oxadiazolyl-(2)]-N'-phenyl-N'-methyl-formamidine,
N-[5-(5-nitrofurfurylidenemethyl)-1,3,4-thiadiazolyl-(2)]-N'-allyl-N'-methyl formamidine,
N-[4-(5-nitrofurfurylidenemethyl)-5-chloro-2-pyrimidyl]-N'-cyclohexyl-N'-methyl-formamidine,
N-[6-(5-nitrofurfurylidenemethyl)-3-as-triazinyl]-N',N'-dimethylacetamidine,
N-[3-(5-nitrofurfurylidenemethyl)-6-as-triazinyl-N'-ethyl-N'-methyl-formamidine,
N-[2-(5-nitrofurfurylidenemethyl)-7-methyl-4-quinolyl-N'-N'-pentamethylene-benzamidine,
N-[4-(5-nitrofurfurylidenemethyl)-8-methoxy-2-quinolyl]-$N^1$,N'-tetramethylene-para-methylbenzamidine,
N-[2-(5-nitrofurfurylidenemethyl)-8-trifluoromethyl-5-quinolyl]-N',N'-dimethyl-para-chlorobenzamidine,
N-[2-[α-(5-nitrofurfurylidene)-ethyl]-8-quinolyl]-N'-cyclopentylmethyl-N'-methyl-formamidine,
N-[2-(5-nitrofurfurylidenemethyl)-5-pyridyl]-N'-(meta-methoxyphenyl)-N'-methyl-formamidine,
N-[2-(5-nitrofurfurylidenemethyl)-3-chloro-6-pyridyl]-N',N'-(3-oxapentamethylene)-formamidine,
N-[4-(5-nitrofurfurylidenemethyl)-6-methyl-2-pyridyl]-N'-(ortho-tolylmethyl)-phenylacetamidine,
N-[4-(5-nitrofurfurylidenemethyl)-3-pyridazinyl]-N'-methyl-N'-ethyl-acetamidine,
N-[4-(5-nitrofurfurylidenemethyl)-6-pyridazinyl]-N'-meta-tolyl-N'-methyl-formamidine,
N-[2-(5-nitrofurfurylidenemethyl)-4-pyrimidyl]-N',N'-(3-methyl-3-azapentamethylene)-formamidine,
N-[2-(5-nitrofurfurylidenemethyl)-6-pyrazinyl]-N'-(meta-chlorobenzyl)-N'-methyl-formamidine,
N-[2-(5-nitrofurfurylidenemethyl)-1-ethyl-4-imidazolyl]-N',N'-dimethyl-para-(trifluoromethyl)-phenylacetamidine,
N-[3-(5-nitrofurfurylidenemethyl)-1-methyl-5-pyrazolyl]-N'-(ortho-methoxybenzyl)-N'-methyl-formamidine
N-[2-(5-nitrofurfurylidenemethyl)-1-methyl-7-methoxy-5-benzimidazolyl]-N'-(para-trifluoromethyl-phenyl)-N'-methyl-para-methoxyphenylacetamidine,
N-[2-(5-nitrofurfurylidenemethyl)-4-oxazolyl]-N'-methyl-N'-ortho-fluorophenyl-formamidine,
N-[2-(5-nitrofurfurylidenemethyl)-4-thiazolyl]-N'-methyl-N'-ethyl-para-fluorophenylacetamidine,
N-[2-(5-nitrofurfurylidenemethyl)-6-methyl-5-benzoxazolyl]-N'-cyclopentyl-N'-methyl-formamidine,
N-[2-(5-nitrofurfurylidenemethyl)-6-chloro-5-benzthiazolyl]-N',N'-dimethylpropionamidine,
N-[2-(5-nitrofurfurylidenemethyl)-4-s-triazinyl]-N'-(para-bromophenyl)-N'-methyl-formamidine and
N-[3-(5-nitrofurfurylidenemethyl)-1,2,4-triazolyl(5)]-N',N'-dimethyl-ortho-methylphenylacetamidine.

What is claimed is:

1. A member selected from the group consisting of poultry feeds and additives to poultry feeds, each containing, in addition to the feed or additive, an amount effective in poultry feeds for ensuring better feed utilizations of a member selected from the group consisting of compounds of the formula

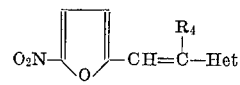

in which Het represents a heterocyclic radical Z' which is C-substituted by the group of the formula

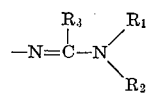

Z' being a member selected from the group consisting of 3-pyridazinyl and 4-pyridazinyl and said radicals C-substituted by a member selected from the group consisting of lower alkyl, lower alkoxy, halogen and trifluoromethyl; $R_1$ and $R_2$ each stands for a member selected from the group consisting of hydrogen, lower alkyl, lower alkenyl, lower cycloalkyl, lower cycloalkenyl, lower cycloalkyl-lower alkyl, lower cycloalkenyl-lower alkyl, phenyl, lower alkyl-phenyl, lower alkoxyphenyl, halogenophenyl, trifluoromethyl-phenyl, phenyl - lower alkyl, lower alkyl - phenyl - lower alkyl, lower alkoxyphenyl-lower alkyl, halogenophenyl-lower alkyl and trifluoromethyl-phenyl-lower alkyl and when taken together with the nitrogen atom, lower alkyleneimino, morpholino, thiomorpholino and N-methyl-piperazino, $R_3$ stands for a member selected from the group consisting of hydrogen, lower alkyl, phenyl, lower alkylphenyl, lower alkoxyphenyl, halogenophenyl, trifluoromethylphenyl, phenyl-lower alkyl, lower alkyl-phenyl-lower alkyl, lower alkoxy-phenyl-lower alkyl, halogenophenyl-lower alkyl and trifluoromethyl-phenyl-lower alkyl, and $R_4$ for a member selected from the group consisting of hydrogen and lower alkyl, and acid addition salts thereof.

2. A poultry feed as claimed in claim 1 containing as active compound an amount effective in poultry feed of a member selected from the group consisting of compounds of the formula

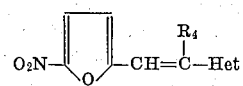

in which Het represents a heterocyclic radical $Z''$ which is C-substituted by the group of the formula

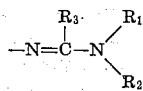

$Z''$ being a member selected from the group consisting of 3-pyridazinyl and 4-pyridazinyl, $R_1$ and $R_2$ each stands for a member selected from the group consisting of hydrogen, lower alkyl, phenyl, lower alkylphenyl, lower alkoxyphenyl, halogenophenyl and trifluoromethylphenyl and, when taken together with the nitrogen atom for pyrrolidino, piperidino, piperazino and morpholino, $R_3$ stands for a member selected from the group consisting of hydrogen, lower alkyl, phenyl, lower alkylphenyl, lower alkoxyphenyl, halogenophenyl and trifluoromethylphenyl and $R_4$ for a member selected from the group consisting of hydrogen and lower alkyl, and acid addition salts thereof and also containing a poultry feeding stuff.

3. A poultry feed additive as claimed in claim 1 containing as active compound an amount effective in poultry feed of a member selected from the group consisting of compounds of the formula

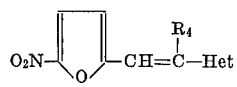

in which Het represents a heterocyclic radical $Z''$ which is C-substituted by the group of the formula

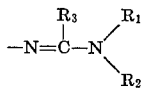

$Z''$ being a member selected from the group consisting of 3-pyridazinyl and 4-pyridazinyl, $R_1$ and $R_2$ each stands for a member selected from the group consisting of hydrogen, lower alkyl, phenyl, lower alkylphenyl, lower alkoxyphenyl, halogenophenyl and trifluoromethylphenyl and, when taken together with the nitrogen atom for pyrrolidino, piperidino, piperazino and morpholino, $R_3$ stands for a member selected from the group consisting of hydrogen, lower alkyl, phenyl, lower alkylphenyl, lower alkoxyphenyl, halogenophenyl and trifluoromethylphenyl and $R_4$ for a member selected from the group consisting of hydrogen and lower alkyl, and acid addition salts thereof and also containing an inert carrier for poultry feed.

4. A poultry feed as claimed in claim 1 containing as active ingredient an amount effective in poultry feed of a member selected from the group consisting of compounds of the formula

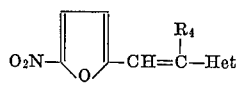

in which Het stands for a heterocyclic radical $Z$ which is C-substituted by the group of the formula

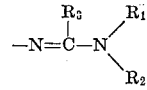

$Z$ being a member selected from the group consisting of 3-pyridazinyl and 4-pyridazinyl and said radicals substituted by a member selected from the group consisting of halogen and trifluoromethyl, $R_1$ and $R_2$ each stands for a member selected from the group consisting of hydrogen, lower alkyl, phenyl, lower alkylphenyl, lower alkoxyphenyl, halogenphenyl and trifluoromethylphenyl and, when taken together with the nitrogen atom for pyrrolidino, piperidino, piperazino and morpholino, $R_3$ stands, for a member selected from the group consisting of hydrogen, lower alkyl, phenyl, lower alkylphenyl, lower alkoxyphenyl, halogenophenyl and trifluoromethylphenyl and $R_4$ for a member selected from the group consisting of hydrogen and lower alkyl, and acid addition salts thereof, and also containing a poultry feeding stuff.

5. A poultry feed additive as claimed in claim 1 containing as active ingredient an amount effective in poultry feed of a member selected from the group consisting of compounds of the formula

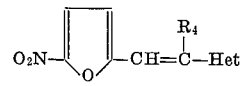

in which Het stands for a heterocyclic radical $Z$ which is C-substituted by the group of the formula

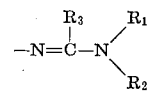

$Z$ being a member selected from the group consisting of 3-pyridazinyl and 4-pyridazinyl and said radicals substituted by a member selected from the group consisting of halogen and trifluoromethyl, $R_1$ and $R_2$ each stands for a member selected from the group consisting of hydrogen, lower alkyl, phenyl, lower alkylphenyl, lower alkoxyphenyl, halogenophenyl and trifluoromethylphenyl and, when taken together with the nitrogen atom for pyrrolidino, piperidino, piperazino and morpholino, $R_3$ stands, for a member selected from the group consisting of hydrogen, lower alkyl, phenyl, lower alkylphenyl, lower alkoxyphenyl, halogenophenyl and trifluoromethylphenyl and $R_4$ for a member selected from the group consisting of hydrogen and lower alkyl, and acid addition salts thereof and also containing an inert carrier for poultry feed.

6. A poultry feed as claimed in claim 1 containing as active ingredient an amount effective in poultry feed of a member selected from the group consisting of compounds of the formula

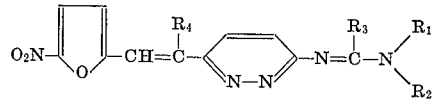

in which $R_1$ and $R_2$ each stands for a member selected from the group consisting of hydrogen, lower alkyl, phenyl, lower alkylphenyl, lower alkoxyphenyl, halogenophenyl and trifluoromethylphenyl and, when taken together with the nitrogen atom for pyrrolidino, piperidino, piperazino and morpholino, $R_3$ stands for a member selected from the group consisting of hydrogen, lower alkyl, phenyl, lower alkylphenyl, lower alkoxyphenyl, halogenophenyl and trifluoromethylphenyl and $R_4$ for a member selected from the group consisting of hydrogen and lower alkyl, and acid addition salts thereof and also containing a poultry feeding stuff.

7. A poultry feed additive as claimed in claim 1 containing as active ingredient an amount effective in poultry feed of a member selected from the group consisting of compounds of the formula

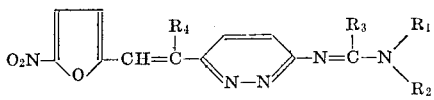

in which $R_1$ and $R_2$ each stands for a member selected from the group consisting of hydrogen, lower alkyl, phenyl, lower alkylphenyl, lower alkoxyphenyl, halogenophenyl and trifluoromethylphenyl and, when taken together with the nitrogen atom for pyrrolidino, piperidino, piperazino and morpholino, $R_3$ stands for a member selected from the group consisting of hydrogen, lower alkyl, phenyl, lower alkylphenyl, lower alkoxyphenyl, halogenophenyl and trifluoromethylphenyl and $R_4$ for a member selected from the group consisting of hydrogen and lower alkyl, and acid addition salts thereof and also containing an inert carrier for poultry feed.

8. A poultry feed as claimed in claim 1 containing as active ingredient an amount effective in poultry feed of a compound of the formula

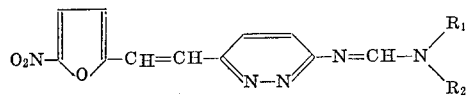

in which $R_1$ and $R_2$ each stands for lower alkyl or an acid addition salt thereof and also containing a poultry feeding stuff.

9. A poultry feed additive as claimed in claim 1 containing as active ingredient a compound of the formula

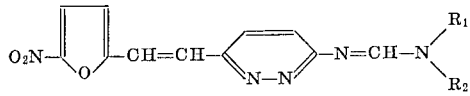

and also containing an inert carrier for poultry feed.

10. A poultry feed as claimed in claim 1 containing as active ingredient N-[3-(5-nitrofurfurylidenemethyl)-6-pyridazinyl]-N':N'-dimethylformamidine or an acid addition salt thereof, and also containing a poultry feeding stuff.

11. A poultry feed additive as claimed in claim 1 containing as active ingredient N-[3-(5-nitrofurfurylidenemethyl)-6-pyridazinyl]-N':N' - dimethylformamidine or an acid addition salt thereof, and also containing an inert carrier for poultry feed.

12. A process for rearing poultry, wherein a feedstuff according to claim 1 is administered to poultry.

13. A process for rearing poultry, wherein a feedstuff according to claim 2 is administered to poultry.

14. A process for rearing poultry, wherein a feedstuff according to claim 4 is administered to poultry.

15. A process for rearing poultry, wherein a feedstuff according to claim 6 is administered to poultry.

16. A process for rearing poultry, wherein a feedstuff according to claim 8 is administered to poultry.

17. A process for rearing poultry, wherein a feedstuff according to claim 10 is administered to poultry.

References Cited

Derwent Farmdoc #21209, abstracting South African Pat. No. 65/5,480 published Apr. 22, 1966.

Goldberg: Antibiotic—Theis Chemistry and Non-Medical Uses, D. Van Nostrand publ., ch. III, pp. 174–182, 1959.

ALBERT T. MEYERS, Primary Examiner

L. SCHENKMAN, Assistant Examiner

U.S. Cl. X.R.

99—4; 424—246, 248

CASE 6041/I

PO-1050
(5/69)

UNITED STATES PATENT OFFICE
CERTIFICATE OF CORRECTION

Patent No. 3,557,284        Dated  January 19, 1971

Inventor(s)  Max Wilhelm et al

It is certified that error appears in the above-identified patent and that said Letters Patent are hereby corrected as shown below:

Column 1, in the structural formula "O$^2$N" should be --- O$_2$N --- before line 25 there should be inserted the word --- wherein --- line 56, "poltry" should be --- poultry ---.

Column 2, line 46, "radicas" should be --- radicals ---; "exampe" should be --- example ---; "cyclohexylor" should be --- cyclohexyl or ---.

Column 3, line 28, delete "herein" and substitute --- hereinafter ---; in the first structural formula delete "R$_2$" and substitute --- R$_4$ ---; delete line 1 after the first structural formula and substitute --- in which R$_4$ represents a lower alkyl radical or especially ---.

Column 4, line 33, "nirogen" should be --- nitrogen ---.

Column 7, delete lines 56-57 and substitute --- ture is then mixed with the bulk of the mixed feed in a horizontal mixer --- line 74, "triazinyl-N'" should be --- triazinyl]-N' ---.

Signed and sealed this 7th day of March 1972.

(SEAL)
Attest:

EDWARD M. FLETCHER, JR.          ROBERT GOTTSCHALK
Attesting Officer                Commissioner of Patents